United States Patent
Nabeshima

(10) Patent No.: US 10,156,934 B2
(45) Date of Patent: Dec. 18, 2018

(54) ELECTRONIC DEVICE AND CONTROL METHOD THEREOF

(71) Applicant: CANON KABUSHIKI KAISHA, Tokyo (JP)

(72) Inventor: Rui Nabeshima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/670,827

(22) Filed: Aug. 7, 2017

(65) Prior Publication Data

US 2018/0046314 A1 Feb. 15, 2018

(30) Foreign Application Priority Data

Aug. 12, 2016 (JP) .................. 2016-158900

(51) Int. Cl.
*H04N 5/232* (2006.01)
*G06F 3/041* (2006.01)
*G06F 3/0488* (2013.01)

(52) U.S. Cl.
CPC .......... *G06F 3/0416* (2013.01); *G06F 3/0412* (2013.01); *G06F 3/0488* (2013.01); *G06F 3/04883* (2013.01); *H04N 5/23293* (2013.01); *G06F 2203/04808* (2013.01)

(58) Field of Classification Search
CPC .......................... H04N 5/23293; G06F 3/0416
USPC .................................................. 348/333.01
See application file for complete search history.

(56) References Cited

U.S. PATENT DOCUMENTS

2008/0278455 A1* 11/2008 Atkins ............... G06F 3/04883
345/173
2013/0194476 A1* 8/2013 Shimosato ......... H04N 5/23293
348/333.01

FOREIGN PATENT DOCUMENTS

JP 2014-44592 A 3/2014

* cited by examiner

*Primary Examiner* — Joel W Fosselman
(74) *Attorney, Agent, or Firm* — Canon USA, Inc., IP Division

(57) ABSTRACT

An electronic device includes a touch detection unit that detects a touch operation on a touch panel, a member operation detection unit that detects an operation to an operating member different from the touch panel, and a control unit that controls a first processing executed based on a start of a first touch on the touch panel when the operation is not performed, a second processing not to be executed based on the touch operation of the first touch while the operation is performed if the operation is performed when the first touch is performed, and executes the first processing based on a movement of a touched position of the first touch after the operation is no longer performed.

14 Claims, 6 Drawing Sheets

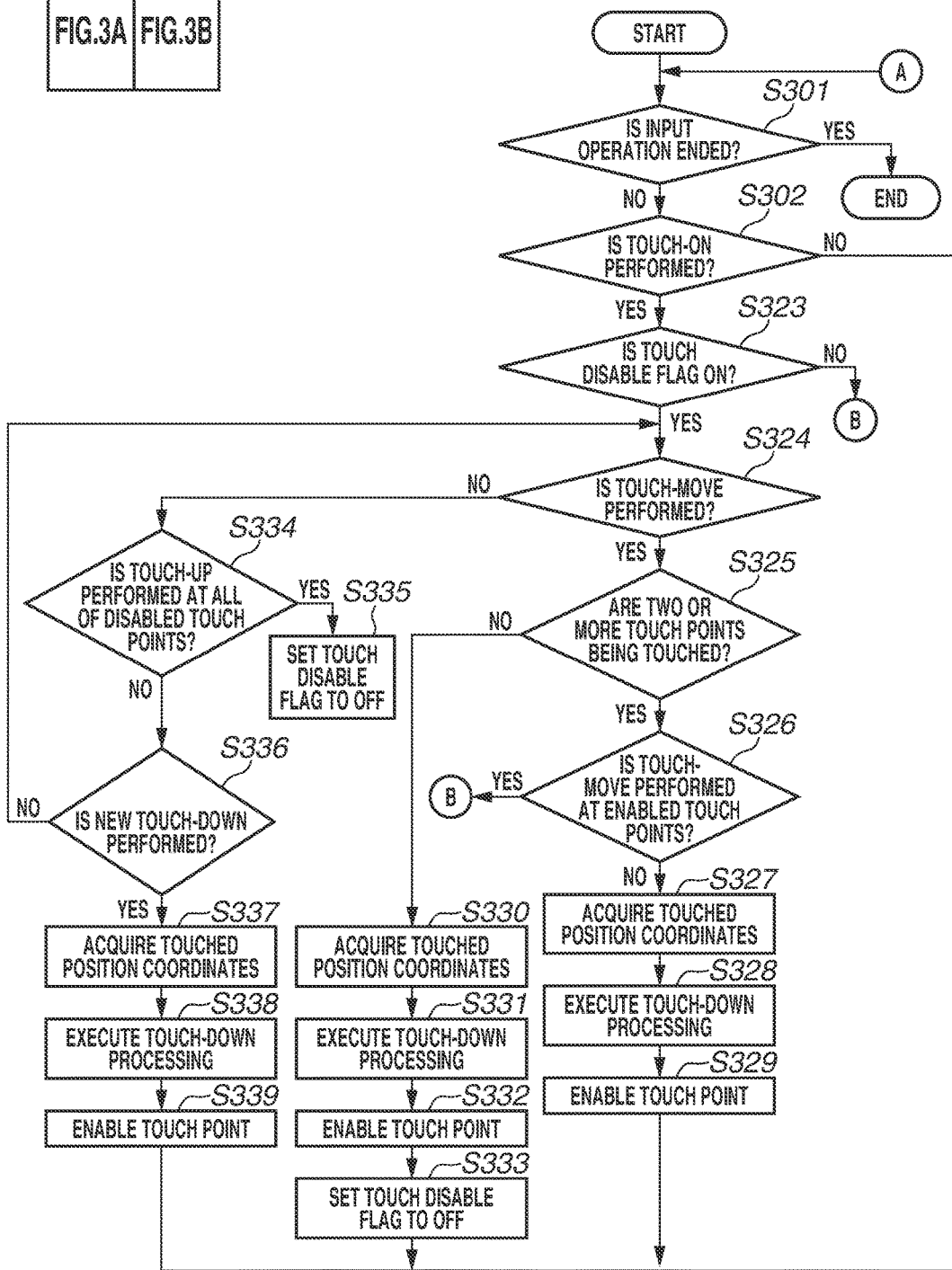

FIG. 5

| SCREEN | SETTING OF AF POSITION THROUGH TOUCH PANEL OPERATION WHILE LOOKING INTO VIEWFINDER | | PLAYBACK SCREEN | MENU SCREEN | CHARACTER INPUT SCREEN |
|---|---|---|---|---|---|
| TYPE OF PROCESSING | ABSOLUTE INPUT | RELATIVE INPUT | | | |
| TOUCH-DOWN PROCESSING | DISPLAY AF FRAME AT TOUCHED POSITION | DISPLAY AF FRAME AT CURRENT SETTING POSITION | IMAGE: NIL ITEM: DISPLAY DETECTION OF TOUCH-DOWN | SELECTED ITEM: DETERMINE ITEM REGION OF THE OTHER ITEMS: SHIFT TO NON-SELECTED STATE | SHIFT TO SELECTED STATE |
| TOUCH-MOVE PROCESSING | MOVE AF FRAME | MOVE AF FRAME | SWITCH IMAGES | SLIDE ITEM LIST | CHANGE SELECTION |
| TOUCH-UP PROCESSING | TRACK OBJECT AT AF FRAME POSITION | TRACK OBJECT AT AF FRAME POSITION | ITEM: EXECUTE FUNCTION | SHIFT TO SELECTED STATE | RESET DETERMINATION OR RETENTION PERIOD |
| MULTI-TOUCH PROCESSING | NIL | NIL | ENLARGE/REDUCE IMAGE | NIL | NIL |
| HOLDING PROCESSING | NIL | NIL | ITEM: SHIFT TO POSITION CHANGE MODE | NIL | ENLARGE CHARACTER |

ELECTRONIC DEVICE AND CONTROL METHOD THEREOF

BACKGROUND

Field

The present disclosure relates to an electronic device and a control method thereof, and particularly relates to a technique of executing control according to a touch operation and an operation to an operating member that accepts the operation other than the touch operation.

Description of the Related Art

Conventionally, there has been known an electronic device provided with both a touch panel and operating members other than the touch panel, such as buttons and sticks, so that a user can perform operations using the respective operating members. There is a case where unexpected processing is executed if processing according to the operation on the touch panel and processing according to the operation to the operating member other than the touch panel are simultaneously executed. Japanese Patent Application Laid-Open No. 2014-44592 discusses a technique of enabling any one of a touch operation on a touch panel and a key-input operation by disabling a touch operation performed in the course of a key-input operation and a key-input operation performed in the course of a touch operation.

In the technique described in Japanese Patent Application Laid-Open No. 2014-44592, even if a user restarts a touch operation without removing a touch performed prior to an end of a key operation after ending the key operation, the touch operation is not enabled, so that the user has to newly start a touch operation after ending the key operation. If a touch operation performed in the course of a key operation is enabled according to an end of the key operation, processing based on the touch operation is executed even if the user touches a touch panel without intending to perform the touch operation.

SUMMARY OF THE INVENTION

The present disclosure is directed to a technique enabling functions to be executed with high operability via a touch operation after an operation of an operating member that exclusively accepts operations other than the touch operation ends.

According to an aspect of the present disclosure, an electronic device includes a touch detection unit configured to detect a touch operation on a touch panel, a member operation detection unit configured to detect an operation to an operating member different from the touch panel, and a control unit configured to control a first processing executed based on a start of a first touch on the touch panel when the operation is not performed, control a second processing executed based on a touch operation when the touch operation is performed after the start of the first touch, control the second processing not to be executed based on the touch operation of the first touch while the operation is performed if the operation is performed when the first touch is performed, and control the first processing to be executed based on a movement of a touched position of the first touch after the operation is no longer performed.

Further features will become apparent from the following description of exemplary embodiments with reference to the attached drawings.

BRIEF DESCRIPTION OF THE DRAWINGS

FIGS. 3A and 3B are a flowchart illustrating input processing according to the present exemplary embodiment.

FIG. 5 is a table illustrating one example of details of processing according to the present exemplary embodiment.

DESCRIPTION OF THE EMBODIMENTS

Hereinafter, an exemplary embodiment will be described with reference to the appended drawings.

Figure 1:
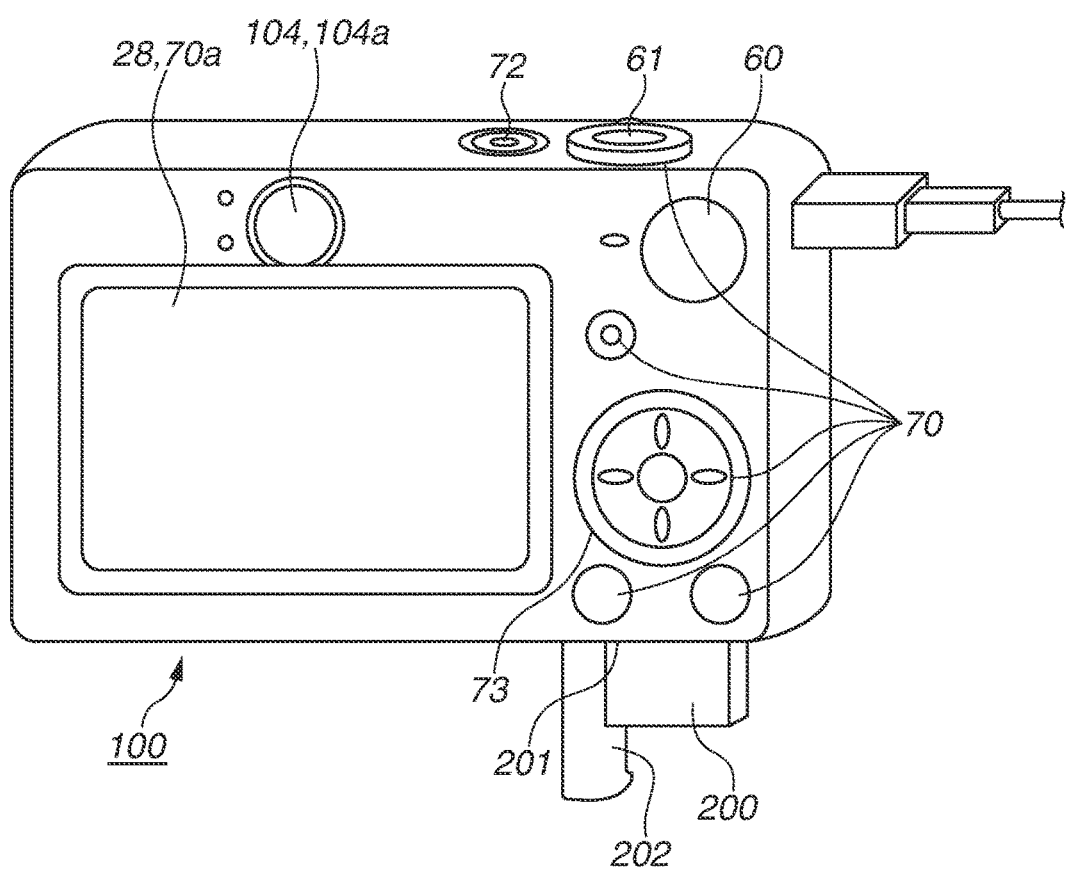
FIG. 1 is a diagram illustrating an external view of a digital camera as one example of an apparatus to which a configuration of a present exemplary embodiment can be applied.

FIG. 1 is a diagram illustrating an external view of a digital camera as one example of an electronic device according to the present exemplary embodiment. A display unit 28 displays images and various types of information. A touch panel 70a is integrally configured with the display unit 28. A shutter button 61 is an operation unit for inputting an imaging instruction, which serves as an operating member that accepts an imaging instruction at a first press level and executes imaging at a second press level. A mode shifting switch 60 is an operation unit for shifting various modes. An operating portion 70 is an operation unit configured of operating members such as various switches, buttons, and a touch panel that accept various operations from the user. A menu button, a playback button, an information display button, a set button, and a cross key are also included in the operating portion 70.

As the operation methods of various buttons (keys), a short-press operation and a long-press operation can be performed according to a pressing period of the button, and respective different functions are executed. For example, if the set button is pressed for a short period when a live view screen is displayed, information relating to imaging operations is displayed on the live view screen, and if the set button is pressed for a long period, the live view screen is shifted to a time display screen. If the cross key is pressed for a short period, an instruction for shifting a selection target, a selected position, or a cursor by one positon in the operating direction is input, and if the cross key is pressed for a long period, an instruction for continuously moving a position by more than one position is input thereto.

A controller wheel 73 is a rotationally operable operating member (i.e., a rotation member or a dial) included in the operating portion 70. A rotation member other than the controller wheel 73 can also be included. When the controller wheel 73 is rotated and operated, an electric pulse signal is generated according to an operation amount, and a system control unit 50 controls respective units of the digital camera 100 based on the pulse signal. An angle of the rotation operation or a number of rotations performed on the controller wheel 73 can be determined based on the pulse signal. In addition, any operating member can be used as the controller wheel 73 as long as the rotation operation can be detected. For example, the controller wheel 73 can be a dial operating member that rotates and generates a pulse signal by itself according to the rotation operation performed by the user.

Alternatively, the controller wheel 73 can be an operating member configured of a touch sensor (a so-called touch wheel), which does not rotate by itself, but detects the rotation operation of the user's finger performed over the controller wheel 73. The rotation member continuously rotates to change a selection target continuously or to move a cursor or a selection target. It is determined that the rotation member is being operated when rotation is continuously performed, and determined that the rotation member is not operated when a predetermined time such as 0.5 sec. or more has passed after the rotation ends.

A viewfinder 104 is a member enabling a user to confirm an object, and can be optically or electrically configured. The user can operate the touch panel 70*a* to change an AF position or press the shutter button 61 to input an imaging instruction while looking into the viewfinder 104. The viewfinder 104 includes an approach detection unit 104*a* that detects approach of the eye (or an object). Because the touch panel 70*a* is arranged just below the viewfinder 104 (i.e., in the close vicinity of the viewfinder 104), a nose of the user looking into the viewfinder 104 is likely to touch the touch panel 70*a*.

A power switch 72 is a push button for switching the on/off state of a power source. A storage medium 200 is a non-volatile storage medium such as a memory card or a hard disk. A storage medium slot 201 is a slot for storing the storage medium 200. The storage medium 200 stored in the storage medium slot 201 can communicate with the digital camera 100, so as to be capable of storing or reproducing data. A cover 202 is a cover of the storage medium slot 201. In FIG. 1, the cover 202 is opened, so that a part of the storage medium 200 is taken out and projected from the slot 201.

Figure 2:
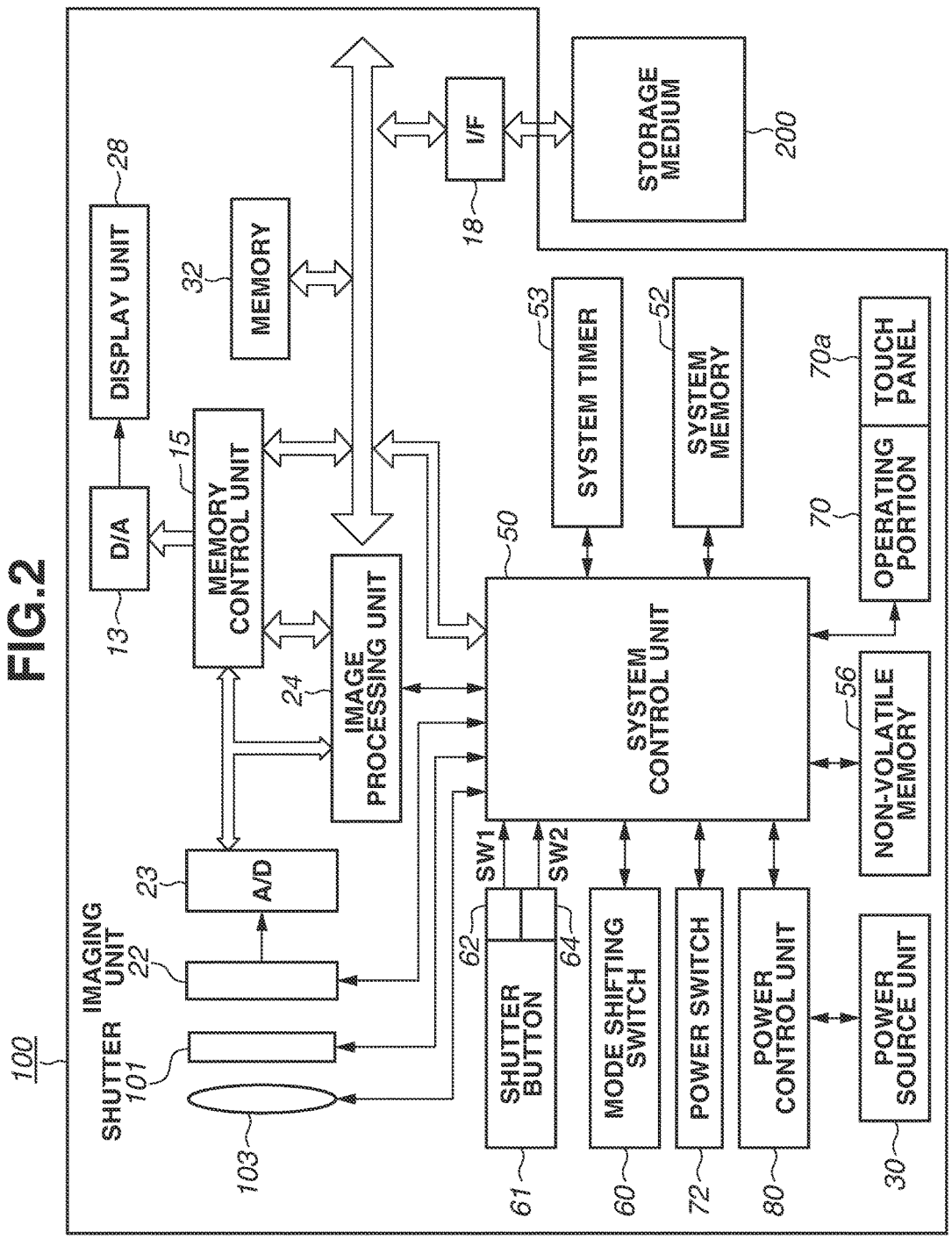
FIG. 2 is a block diagram illustrating a configuration example of a digital camera as one example of an apparatus to which a configuration of the present exemplary embodiment can be applied.

FIG. 2 is a block diagram illustrating a configuration example of the digital camera 100 according to the present exemplary embodiment.

In FIG. 2, an imaging lens 103 is a lens group including a zoom lens and a focus lens. A shutter 101 is a shutter including an aperture function. An imaging unit 22 is an image sensor configured of a charge coupled device (CCD) sensor or a complementary metal-oxide semiconductor (CMOS) sensor that converts an optical image into an electric signal. An analog/digital (A/D) conversion unit 23 is used for converting an analog signal output from the imaging unit 22 into a digital signal.

An image processing unit 24 executes predetermined resizing processing or color conversion processing such as scaling or pixel interpolation with respect to data received from the A/D conversion unit 23 or a memory control unit 15. The image processing unit 24 executes predetermined arithmetic processing by using captured image data, and a system control unit 50 executes exposure control and focusing control based on the acquired arithmetic result. With this configuration, autofocus (AF) processing, auto-exposure (AE) processing, and pre-flash (EF) processing are executed by a through-the-lens (TTL) method. The image processing unit 24 executes predetermined arithmetic processing by using captured image data, and also executes auto-white balance (AWB) processing by the TTL method based on the acquired arithmetic result.

Data output from the A/D conversion unit 23 is directly written in a memory 32 via the image processing unit 24 and the memory control unit 15, or via the memory control unit 15 without interposing the image processing unit 24. The memory 32 stores image data acquired by the imaging unit 22 and converted into digital data by the A/D conversion unit 23 or image data to be displayed on a display unit 28. The memory 32 has a storage capacity sufficient for storing a predetermined number of still images or a predetermined period of moving image or audio data. The memory 32 also serves as an image display memory (video memory). A digital/analog (D/A) conversion unit 13 converts image display data stored in the memory 32 into an analog signal and supplies the analog signal to the display unit 28. With this configuration, the image display data written in the memory 32 is displayed on the display unit 28 via the D/A conversion unit 13.

The display unit 28 displays data on a display device such as a liquid crystal display (LCD) according to the analog signal transmitted from the D/A conversion unit 13. Data first converted into a digital signal through A/D conversion by the A/D conversion unit 23 is stored in the memory 32. Then, the digital signal is converted into an analog signal by the D/A conversion unit 13 and sequentially transferred to the display unit 28. The display unit 28 displays data of the received analog signal, so as to function as an electric viewfinder to execute through-image display (live view image display).

A non-volatile memory 56 is a storage medium electrically erasable, recordable, and readable by a system control unit 50. For example, a memory such as an electrically erasable programmable read-only memory (EEPROM) can be used as the non-volatile memory 56. The non-volatile memory 56 stores an operation constant for the system control unit 50 and a program. Herein, "program" refers to a computer program for executing various flowcharts described in the present exemplary embodiment.

The system control unit 50 includes at least one processor, and controls the digital camera 100. The system control unit 50 executes the above-described program stored in the non-volatile memory 56 to realize below-described respective pieces of processing of the present exemplary embodiment. A random access memory (RAM) is used as a system memory 52. An operation constant or variable of the system control unit 50 and a program read from the non-volatile memory 56 are loaded on the system memory 52. The system control unit 50 controls the memory 32, the D/A conversion unit 13, and the display unit 28 to execute display control.

A system timer 53 is a time measurement unit that measures a time used for various types of control or a time of a built-in clock. The mode shifting switch 60, the shutter button 61, and the operating portion 70 are operation units enabling the user to input various operation instructions to the system control unit 50. The mode shifting switch 60 enables the user to shift an operation mode of the system control unit 50 to a still image recording mode or a moving image capturing mode.

When a shutter button 61 provided on the digital camera 100 is operated halfway and brought into a half-pressed state (i.e., acceptance of an imaging preparation instruction), a first shutter switch 62 is turned ON so as to generate a first shutter switch signal SW1. With generation of the first shutter switch signal SW1, various kinds of processing, such as AF processing, AE processing, AWB processing, and EF processing are started.

When the shutter button 61 is completely operated and brought into a fully-pressed state (i.e., acceptance of an imaging instruction), a second shutter switch 64 is turned ON so as to generate a second shutter switch signal SW2. With generation of the second shutter switch signal SW2, the system control unit 50 starts operation for a series of imaging processes, such as capturing a still image through the imaging unit 22, reading a signal from the imaging unit 22, and writing image data into the storage medium 200.

The user selects and operates various function items displayed on the display unit 28 to allocate the functions to respective operating members of the operating portion 70 as appropriate according to a situation, so that the operating members function as various function buttons. For example, the function buttons can be an end button, a return button, an image-forwarding button, a jump button, a narrowing-down button, and an attribute-changing button. For example, when a menu button is pressed, a menu screen including various settable items is displayed on the display unit 28. The user can intuitively perform various settings by using the menu screen displayed on the display unit 28, the four-direction button in the up/down/right/left directions, and the SET button.

A power control unit 80 is configured of a battery detection circuit, a direct current-to-direct current (DC-DC) converter, and a switching circuit for switching blocks to be energized, so as to execute detection of presence or absence of attached batteries, battery types, and a remaining battery amount. Based on the detection result and an instruction from the system control unit 50, the power control unit 80 controls the DC-DC converter to supply necessary voltage to respective units, including the storage medium 200, for a necessary period.

A power source unit 30 is configured of a primary battery (i.e., an alkaline battery or a lithium battery), a secondary battery (i.e., a nickel-cadmium (NiCd) battery, a nickel-metal hydride (NiMH) battery, or a lithium-ion (Li-ion) battery), and an alternating current (AC) adapter. A storage medium interface (I/F) 18 is an interface of the storage medium 200, such as a memory card or a hard disk. The storage medium 200 is a non-volatile storage medium, such as a memory card, for storing images in the image capturing period, and configured of a semiconductor memory, an optical disk, or a magnetic disk. The power switch 72 is an operation unit that accepts a switching operation of the ON/OFF states of the power source from the user.

A touch panel 70a that detects a touch with respect to the display unit 28 is provided as a part of the operating portion 70. The touch panel 70a can be integrally configured with the display unit 28. For example, the touch panel 70a is formed such that light transmittance does not interfere with a display provided by the display unit 28 and is attached to an upper layer of a display face of the display unit 28. The input coordinates of the touch panel 70a are associated with the display coordinates of the display unit 28. With this configuration, a graphical user interface (GUI) is provided that the user can use as if the user directly operates a screen displayed on the display unit 28.

The system control unit 50 can detect the following operations with respect to the touch panel 70a or the states of the touch panel 70a:
  a state where a finger or a stylus pen that has not previously touched the touch panel 70a touches the touch panel 70a, i.e., start of a touch (hereinafter, referred to as "Touch-Down").
  a state where a finger or a stylus pen keeps touching the touch panel 70a (hereinafter, referred to as "Touch-On").
  a state where a finger or a stylus pen moves while touching the touch panel 70a (hereinafter, referred to as "Touch-Move").
  a state where a finger or a stylus pen that is touching the touch panel 70a is removed, i.e., end of a touch (hereinafter, referred to as "Touch-Up").
  a state where neither a finger nor a stylus pen touches the touch panel 70a (hereinafter, referred to as "Touch-Off").

When "Touch-Down" is detected, "Touch-On" is simultaneously detected. Normally, unless "Touch-Up" is detected after "Touch-Down", "Touch-On" is continuously detected. "Touch-Move" is also detected when "Touch-On" is detected. Even if "Touch-On" is detected, "Touch-Move" is not detected if a touched position is not moved. After "Touch-Up, the touch panel 70a is brought into "Touch-Off". An operation called "pinch-in" in which a distance between two touch points is reduced, and an operation called "pinch-out" in which a distance between two touch points is increased, can be performed.

The above-described operations or states and the position coordinates at which the finger or the stylus pen touches the touch panel 70a are provided to the system control unit 50 via an internal bus, and the system control unit 50 determines what operation has been executed on the touch panel 70a based on the provided information. A moving direction of the finger or the stylus pen moved on the touch panel 70a during "Touch-Move" can also be determined at each of vertical and horizontal components of the touch panel 70a, based on the change of position coordinates.

When the user performs "Touch-Up" from "Touch-Down" after performing a certain period of "Touch-Move" on the touch panel 70a, it is assumed that a stroke is drawn thereon. The operation of quickly drawing a stroke is called a "flick". A "flick" is an operation where the user quickly moves the user's finger or the stylus pen over a certain distance while touching the touch panel 70a and removes the user's finger or stylus pen therefrom. In other words, the "flick" is an operation by the user to quickly sweep the touch panel 70a with the user's finger or stylus pen. When "Touch-Move" of a predetermined distance or more at a predetermined speed or more is detected and "Touch-Up" is continuously detected thereafter, the system control unit 50 determines that a "flick" is performed. When "Touch-Move" of a predetermined distance or more at a predetermined speed or less is detected, the system control unit 50 determines that a drag operation is performed.

A touch panel of various types, i.e., a resistive film type, an electrostatic capacitance type, a surface elastic wave type, an infrared type, an electromagnetic induction type, an image recognition type, and an optical sensor type can be used as the touch panel 70a. A touch panel of any detection method can be employed, and thus the touch can be detected when the user's finger or the stylus pen is in contact with the touch panel 70a, or can be detected when the user's finger or the stylus pen is moved close to the touch panel 70a but does not contact it When a touch is detected, a touch identification (ID) is applied to the touch point, and the touch ID is stored in the system memory 52. Processing according to the touch operation is not always executed even if the touch is performed. The processing is executed when a touch point where the touch operation is performed is enabled, and the processing is not executed even if the touch operation is performed when a touch point is disabled.

Figure 3B:
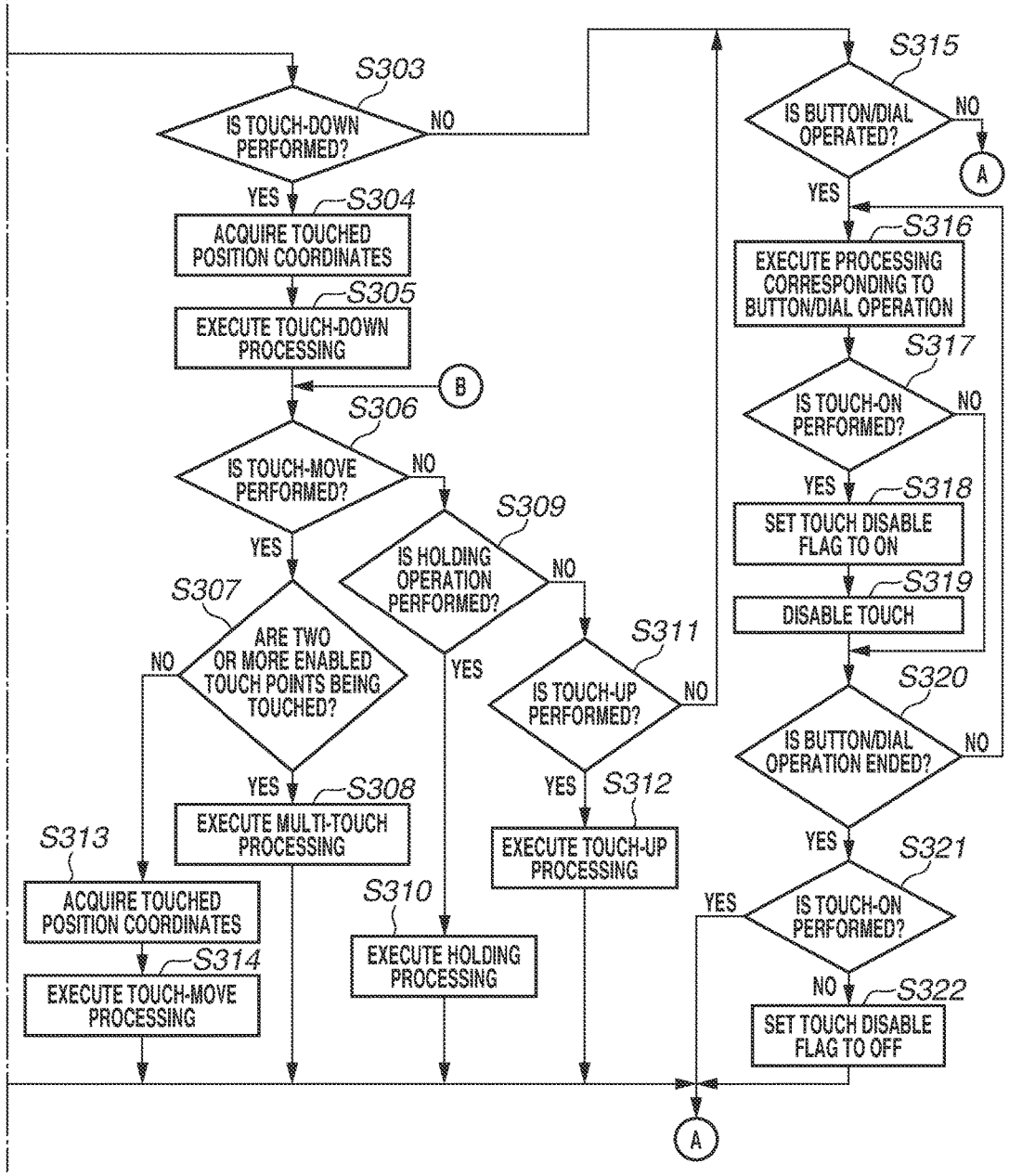

Next, input processing of the present exemplary embodiment will be described with reference to FIGS. 3A and 3B. The system control unit 50 loads a program stored in the non-volatile memory 56 to the system memory 52 and executes the program to realize the processing. In addition, this processing starts when power is supplied to the digital camera 100 and the touch panel 70a and the operating portion 70, such as the controller wheel 73, are operable. In FIGS. 3A and 3B, although "Touch-Down" processing, "Touch-Move" processing, "Touch-Up" processing, and holding processing will be described as the input processing, the operation to be actually performed at each processing can vary based on the modes (screens) of the digital camera 100. The processing in respective modes (screens) are described below with reference to FIG. 5.

In step S301, the system control unit 50 determines whether input processing should end. The input processing can end when the user turns off the power of the digital camera 100, or enables a setting for prohibiting a touch operation (i.e., enabling only a button operation). If the system control unit 50 determines that the input processing should end (YES in step S301), the processing ends. If the system control unit 50 determines that the input processing should not end (NO in step S301), the processing proceeds to step S302.

In step S302, the system control unit 50 determines whether the touch panel 70a is in a touched state ("Touch-On"). If the system control unit 50 determines that the touch panel 70a is in a touched state (YES in step S302), the processing proceeds to step S323. If the system control unit 50 determines that the touch panel 70a is not in a touched state (NO in step S302), the processing proceeds to step S303.

In step S303, the system control unit 50 determines whether "Touch-Down" is performed on the touch panel 70a. As described above, "Touch-Down" refers to a state where the touch panel 70a is newly touched, but also refers to a start of the touch operation. A touch ID is applied to the touch point detected in step S303. The touch ID is an ID for identifying a touch point. Information such as current touched position coordinates of each touch point on the touch panel 70a, a retention time for retaining a touch without moving a touched position from a position of "Touch-Down", touched position coordinates prior to the movement of a touched position, and an enabled/disabled state of a touch point are stored in the touch ID. When a plurality of touch points exists, the touch points have respective different touch IDs. Because the touch ID is applied to each touch point, a movement of each touch point can be followed. For example, it is possible to identify a touched position of which touch ID is moved (i.e., which touch point the user has performed "Touch-Move"), which touch point the user has performed "Touch-Up", or which two points the user has performed a multi-touch operation.

Regardless of whether the touch is enabled or disabled, the touch ID is applied as long as the touch panel 70a is physically touched. If an enabled state is stored in the touch ID, processing corresponding to the operation performed on the touch point is executed. However, if a disabled state is stored in the touch ID, processing corresponding to the operation performed on the touch point is not executed. When the touch point is disabled, the touched position coordinates and only information indicating a disabled state can be stored in the touch ID. If the system control unit 50 determines that "Touch-Down" is performed (YES in step S303), the processing proceeds to step S304. If the system control unit 50 determines that "Touch-Down" is not performed (NO in step S303), the processing proceeds to step S315.

In step S304, the system control unit 50 acquires "Touch-Down" coordinates (touched position coordinates) of the touch point at which "Touch-Down" is determined in step S303, and updates (applies) the touch ID. The touched position coordinates can be acquired from the touch panel 70a or can be calculated by the system control unit 50.

In step S305, the system control unit 50 executes "Touch-Down" processing. The "Touch-Down" processing is described below with reference to FIG. 5. Because "Touch-Down" is detected for the first time in step S303 in a state where no other touch point is detected in step S302 (i.e., "NO" in step S302), this touch point is enabled.

In step S306, the system control unit 50 determines whether a touched position of the touch point in a touched state is moved (i.e., "Touch-Move" is performed). The system control unit 50 compares the previous touched position coordinates acquired in step S304 and the current touched position coordinates, and determines that the touched position is moved if there is a difference of a predetermined distance or more. The predetermined distance used for the above determination can be changed according to a mode, a screen, or an operation target, or can be a constant value, such as 1 cm or 2 cm. If the system control unit 50 determines that the touched position is moved (YES in step S306), the processing proceeds to step S307. If the system control unit 50 determines that the touched position is not moved (NO in step S306), the processing proceeds to step S309.

In step S307, the system control unit 50 determines whether two or more enabled touch points currently exist in the touch panel 70a. Even if the touch points at which the user touches the touch panel 70a exist, processing based on the touch points will not be executed if the touch operation is disabled because of the button operation or the dial operation described below in steps S315 to S322. However, if "Touch-Down" is newly performed or the touched position is moved after the button or the dial is operated, that new touch point is enabled.

If Touch-Move is performed when two or more enabled touch points exist, multi-touch processing such as "Pinch-In" or "Pinch-Out" is executed. Therefore, in step S307, the system control unit 50 determines whether multi-touch processing should be executed. If the system control unit 50 determines that two or more enabled touch points exist (YES in step S307), the processing proceeds to step S308. If the system control unit 50 determines that two or more enabled touch points do not exist (NO in step S307), the processing proceeds to step S313.

In step S308, the system control unit 50 executes multi-touch processing. The multi-touch processing is described below with reference to FIG. 5. With respect to a mode in which the digital camera 100 does not accept the multi-touch processing, "Touch-Move" processing is executed based on the touch point that is lastly moved from among the touch points in touched states.

In step S309, the system control unit 50 determines whether a holding operation is performed, i.e., a touched state is retained for a predetermined time or more without moving the touched position after "Touch-Down". According to the detection of "Touch-Down" in step S303 or S336, the system timer 53 starts measuring the time, and the system control unit 50 determines that the holding operation is performed when the measured time exceeds a predetermined time, such as 2 sec. or 3 sec. If the system control unit 50 determines that the holding operation is performed (YES in step S309), the processing proceeds to step S310. If the system control unit 50 determines that the holding operation is not performed (NO in step S309), the processing proceeds to step S311.

In step S310, the system control unit 50 executes holding processing. The holding processing is described below with reference to FIG. 5. In step S311, the system control unit 50 determines whether an operation of removing a touch from the touch panel 70a ("Touch-Up") is detected. If the system control unit 50 determines that the operation of removing the touch is detected (YES in step S311), the processing proceeds to step S312. If the system control unit 50 determines that the operation of removing the touch is not detected (NO in step S311), the processing proceeds to step S315.

In step S312, the system control unit 50 executes "Touch-Up" processing. The "Touch-Up" processing is described below with reference to FIG. 5. In addition, when "Touch-Up" is performed, the touch ID is deleted according to execution of the "Touch-Up" processing. Because the touch ID is applied to a touch point that is physically "Touch-On" regardless of whether the touch is enabled or disabled, the touch ID is also deleted when the touch is physically removed and the "Touch-On" state is cancelled.

In step S313, the system control unit 50 acquires touched position coordinates of the touch point a touched position of which is moved in step S306 (just one touch point because a determination result in step S307 is "NO"), and updates the information relating to the touched position coordinates stored in the touch ID. In step S314, the system control unit 50 executes "Touch-Move" processing. The "Touch-Move" processing is described below with reference to FIG. 5.

In step S315, the system control unit 50 determines whether a button operation or a dial operation is performed (started). In other words, the system control unit 50 determines whether a member operation different from the touch operation is performed (detected). The button operation refers to a press of a button, such as the shutter button 61, the menu button, or the playback button. The dial operation refers to a rotation operation of a dial, such as the controller wheel 73. If the system control unit 50 determines that the button operation or the dial operation is performed (YES in step S315), the processing proceeds to step S316. If the system control unit 50 determines that the button operation or the dial operation is not performed (NO in step S315), the processing proceeds to step S301.

In step S316, the system control unit 50 executes processing corresponding to the button operation or the dial operation performed in step S315. When the button operation or the dial operation is performed, the processing corresponding to the performed button operation or dial operation is executed regardless of whether the touch operation is being performed.

In step S317, similar to step S302, the system control unit 50 determines whether "Touch-On" is performed on the touch panel 70a. If the system control unit 50 determines that "Touch-On" is performed, i.e., if a button or a dial is operated while a touch operation is being performed (YES in step S317), the processing proceeds to step S318. If the system control unit 50 determines that "Touch-On" is not performed, i.e., if a button or a dial is operated when a touch operation is not performed (NO in step S317), the processing proceeds to step S320.

In step S318, the system control unit 50 sets a touch disable flag to ON, and stores the setting in the system memory 52. The information stored in the touch ID of the touch point currently in a touched state, which indicates an enabled/disabled state of the touch point, is set to "disable" and updated. The touch disable flag is set to ON when a button or a dial is operated in a touched state, and a touch operation that is performed during that period will not be enabled even if the button operation or the dial operation ends.

The touch disable flag is also set to ON if a touch operation is performed when a button or a dial is being operated. This is because although the button operation or the dial operation that is performed when the user is performing the touch operation is likely to be intentionally performed, a touch that remains after the user ends the button operation or the dial operation is likely to be unintentionally performed. Therefore, the touch disable flag is set to ON in order not to execute processing according to the touch operation caused by the touch unintentionally kept by the user after the button operation or the dial operation.

If the touch disable flag is not set to ON, the processing according to the touch operation is executed when the button operation or the dial operation is completed. Therefore, the user may be confused because an execution timing of the processing is different from the timing at which the user has actually started the touch operation. When the touch disable flag is set to ON, although the touch ID of the touch point where "Touch-On" is performed (touched position coordinates) is stored, the touch is disabled and regarded as a "Touch-Off" state (i.e., a state where "Touch-On" is not performed).

In step S319, the system control unit 50 disables the touch processing. The processing according to the touch operation detected prior to detection of the button operation or the dial operation in step S315 is disabled in step S319. In other words, the touch operation is disabled when the operating member is continuously operated.

In step S320, the system control unit 50 determines whether the button operation or the dial operation previously started in step S315 ends. Ending of the button operation or the dial operation refers to a state where a rotation of a dial such as the controller wheel 73 is stopped, or a press of a button, such as the shutter button 61 ends. If the system control unit 50 determines that the button operation or the dial operation ends (YES in step S320), the processing proceeds to step S321. If the system control unit 50 determines that the button operation or the dial operation has not ended, i.e., the button or the dial is continuously operated (NO in step S320), the processing proceeds to step S316.

In step S321, similar to step S302, the system control unit 50 determines whether "Touch-On" is performed on the touch panel 70a. If the system control unit 50 determines that "Touch-On" is performed, i.e., if the user is performing the touch operation when a button operation or a dial operation ends (YES in step S321), the processing proceeds to step S301. If the system control unit 50 determines that "Touch-On" is not performed, i.e., a touch operation is not performed (NO in step S321), the processing proceeds to step S322. In step S321, the "Touch-On" state is determined regardless of whether the touch point is enabled or disabled.

In step S322, the system control unit 50 sets the touch disable flag set to ON in step S318 to OFF. In other words, in a case where the user starts operating the button or the dial while performing a touch and removes the touch before ending the operation of the button or the dial, the touch disable flag is set to OFF because a touch point to be disabled does not exist.

Figure 4A:
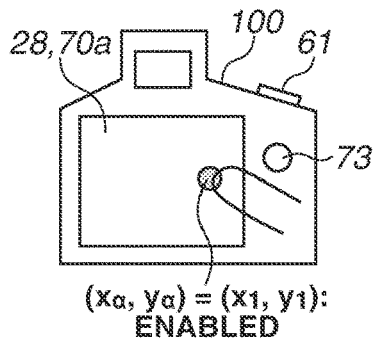
FIGS. 4A, 4B, 4C, 4D, 4E, 4F, 4G, and 4H are diagrams illustrating states of a touch operation and a button operation according to the present exemplary embodiment.

The processing in steps S303 to S322 will be described with reference to FIGS. 4A to 4C. FIGS. 4A to 4C are diagrams illustrating a state where the shutter button 61 is pressed when a touch operation is being performed on the touch panel 70a, and the touch operation is continuously performed after the press of the shutter button 61 ends. FIG.

4A is a diagram illustrating a state where the touch operation is performed on the touch panel 70a (i.e., a state in steps S303 to S314). At this time, the information stored in the touch ID of the touch point in a touched state indicates a touch ID number as touch coordinates (xα, yα) as "(x1, y1)", and a touch enabled/disabled state as "enabled". Therefore, processing according to the touch operation is executed because the touch is enabled.

Next, when the shutter button 61 is pressed as illustrated in FIG. 4B, processing (imaging processing) of the shutter button 61 is executed even if the touch operation is being performed, and the processing based on the touch operation is not executed. Then, the touch point where the touch is performed is disabled, so that the information stored in the touch ID indicates a touch ID number as "1", touch coordinates (xα, yα) as "(x1, y1)", and a touch enabled/disabled state as "disabled", and the touch disable flag is also set to ON (i.e., a state in step S318). As illustrated in FIG. 4C, even if the press of the shutter button 61 ends, the touch disable flag remains in the ON state, and the information stored in the touch ID is not changed (i.e., a state after step S320).

Processing in step S323 is executed if "Touch-On" is determined in step S302. In step S323, the system control unit 50 determines whether the touch disable flag is ON. If the system control unit 50 determines that the touch disable flag is ON (YES in step S323), the processing proceeds to step S324. If the system control unit 50 determines that the touch disable flag is OFF (NO in step S323), the processing proceeds to step S306.

In step S324, similar to step S306, the system control unit 50 determines whether a touched position of the touch point in a touched state is moved (i.e., "Touch-Move" is performed). Similar to the determination in step S306, the system control unit 50 can determine that the touched position is moved when the touched position is moved by 1 cm or 2 cm, or when the touched position is moved by a distance shorter than a distance moved in step S306. If the system control unit 50 determines that the touched position is moved (YES in step S324), the processing proceeds to step S325. If the system control unit 50 determines that the touched position is not moved (NO in step S324), the processing proceeds to step S334.

In step S325, the system control unit 50 determines whether two or more touch points currently exist (i.e., whether two or more touch IDs exist). In step S325, touch points are determined regardless of whether the touch points are enabled or disabled as long as the touch IDs are applied thereto. If the system control unit 50 determines that two or more touch points exist (YES in step S325), the processing proceeds to step S326. If the system control unit 50 determines that less than two touch points exists (NO in step S325), the processing proceeds to step S330.

In step S326, the system control unit 50 determines whether the touch points touched positions of which are moved are enabled. If the system control unit 50 determines that the touch points touched positions of which are moved are enabled (YES in step S326), the processing proceeds to step S306. If the system control unit 50 determines that the touch points touched positions of which are moved are not enabled (NO in step S326), the processing proceeds to step S327.

In step S327, the system control unit 50 acquires respective touched position coordinates of the touch points touched positions of which are moved, and updates the information relating to the touched position coordinates stored in the touch IDs. The processing in steps S327 to S329 is executed when the system control unit 50 determines that the touched position is moved in step S324, and also determines that touched positions of disabled touch points are moved in step S325 and S326. Through the processing in steps S327 to S329, each of the touch points that are disabled when the touch disable flag is ON is brought into a "Touch-On" state according to a movement of the touched position. In other words, even if a touch is disabled because of the button operation or the dial operation, the touch is enabled when the user intentionally moves the touched position to perform a touch operation. In step S326, if the system control unit 50 determines that the touched position of the enabled touch point is moved (YES in step S326), the processing proceeds to steps S306 and subsequent steps, so that the system control unit 50 executes multi-touch processing or "Touch-Move" processing.

In step S328, the system control unit 50 executes "Touch-Down" processing. In step S328, the system control unit 50 execute processing while assuming that the touch that has been disabled because of the button operation or the dial operation is brought into a "Touch-Down" state according to the movement of the touched point. Because the touch has been brought into a disabled state (i.e., "Touch-Off" state) after the user has intentionally performed the button operation or the dial operation, in step S328, the system control unit 50 executes the "Touch-Down" processing while assuming that "Touch-Down" is performed according to the movement of the touched position.

In other words, because the user has intentionally moved the touched position, even if the touch was being performed prior to the end of the button operation or the dial operation, the system control unit 50 assumes that the user intends to perform the touch operation, enables the touch that has been disabled, and newly executes the processing equivalent to the processing executed when the touch is started. After the touch disable flag is ON, "Touch-Down" processing is executed according to the movement of the touched position by a predetermined distance, and "Touch-Move" processing is consecutively executed when the touched position is further moved.

In step S329, the system control unit 50 enables the touch point a touched position of which is moved, and stores information indicating an enabled state of the touch in the touch ID. Because only a moved touch point is enabled when a plurality of disabled touch points exists, expected processing is executed while unexpected processing is prevented from being executed even if the user unintentionally keeps touching the touch panel 70a. Thus, the operability thereof is improved.

Processing in steps S303 to S329 (mainly in steps S324 to S329) are described with reference to FIGS. 4E to 4H. FIGS. 4E to 4H are diagrams illustrating a state where a user U performs a touch operation on the touch panel 70a provided on the back face of digital camera 100 to change a position for performing AF or AE while looking into the viewfinder 104. The user U who is looking into the viewfinder 104 is indicated by a dashed line.

Figure 4E:
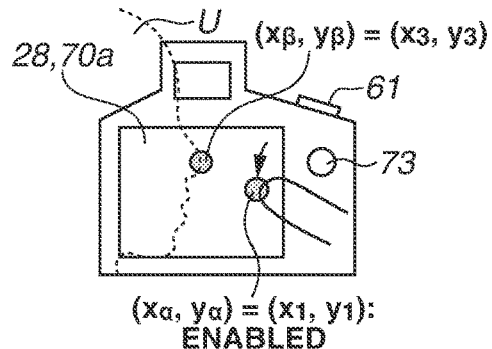
Figure 4B:
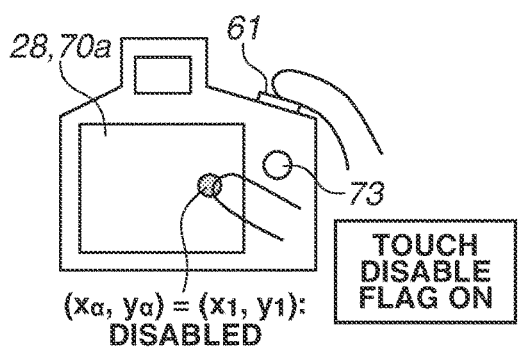

FIG. 4E illustrates a state where the user U touches the touch panel 70a with the user's finger while looking into the viewfinder 104. At this time, the information stored in a touch ID of a touch point of the user's finger indicates a touch ID number as "1", touch coordinates (xα, yα) as "(x1, y1)", and a touch enabled/disabled state as "enabled". The user's nose also touches the touch panel 70a, so that the information stored in a touch ID of a touch point of the nose indicates a touch ID number as "2", touch coordinates (xβ, yβ) as "(x3, y3)", and a touch enabled/disabled state as "enabled".

Figure 4F:
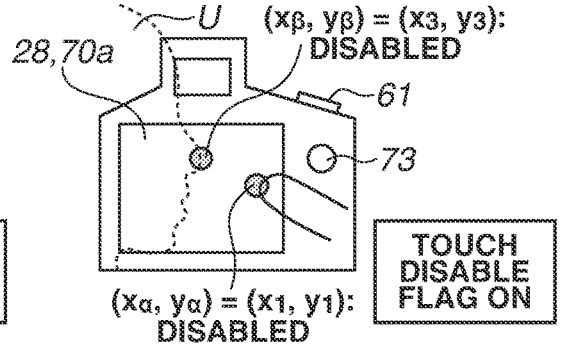
Figure 4C:
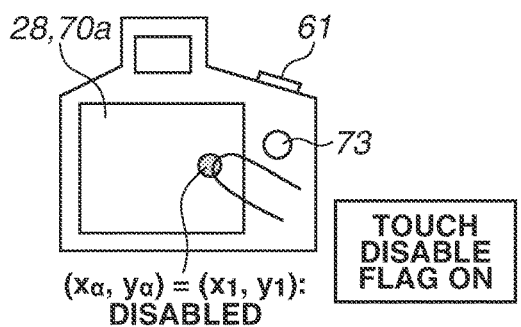

Next, when the shutter button 61 is pressed, as illustrated in FIG. 4F, processing (imaging processing) of the shutter button 61 is executed even if the touch operation is being performed, and the processing based on the touch operation is not executed. Then, the touch point in a touched state is disabled, and the touch disable flag is set to ON (i.e., a state in step S318). Thus, the information stored in the touch ID of the touch point of the user's finger indicates a touch ID number as "1", touch coordinates (xα, yα) as "(x1, y1)", and a touch enabled/disabled state as "disabled". The information stored in the touch ID of the touch point of the nose of the user U indicates a touch ID number as "2", touch coordinates (xβ, yβ) as "(x3, y3)", and a touch enabled/disabled state as "disabled".

Figure 4G:
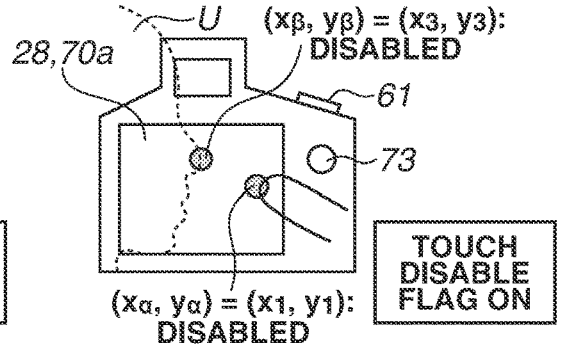
Figure 4D:
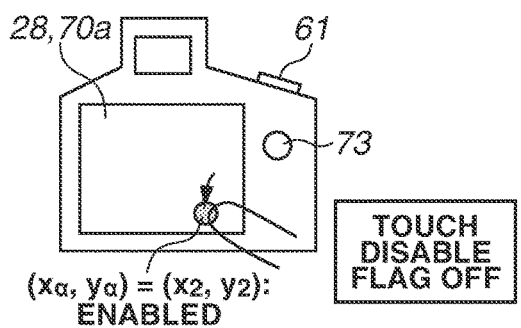
Figure 4H:
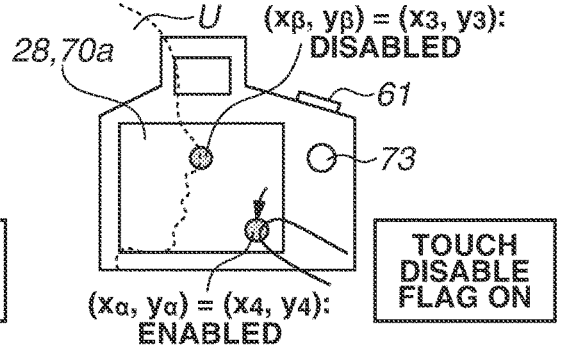

As illustrated in FIG. 4G, even if the press of the shutter button 61 ends, the touch disable flag remains in the ON state, respective pieces of information stored in both of the touch IDs are not changed, and both of the touch points remain in the disabled state (i.e., a state after step S320). As described in steps S324 to S329, the touch point a touched position of which is moved is enabled while the touch point a touched position of which is not moved remains in a disabled state unless the touch is removed. Therefore, when the touch point touched by the finger of the user U is moved, only the touch point of the moved finger is enabled, as illustrated in FIG. 4H.

The information stored in the touch ID of the touch point of the finger of the user U indicates a touch ID number as "1", touch coordinates (xα, yα) as "(x4, y4)", and a touch enabled/disabled state as "enabled". The information stored in the touch ID of the touch point of the user's nose remains unchanged, so as to indicate a touch ID number as "2", touch coordinates (xβ, yβ) as "(x3, y3)", and a touch enabled/disabled state as "disabled". As described above, because the touch point a touched position of which is moved is enabled while the touch point a touched position of which is not moved is disabled, unexpected processing caused by an unintentional touch operation, such as touching the touch panel 70a with the nose, is preventable.

For example, in a case where an AF position is to be set by the touch operation, the touch point is enabled when the user U moves the touch point of the finger in order to move an AF frame. However, because the touch point unintentionally touched by the nose remains in the disabled state, the AF frame is not moved by the touch of the nose. Particularly, the nose is likely to touch the touch panel 70a when the user operates the touch panel 70a provided under the viewfinder 104 while looking into the viewfinder 104. Therefore, preventing an erroneous operation caused by the touched nose enables the user to perform the intended operation, and thus the operability can be improved.

In step S330, the system control unit 50 acquires the touched position coordinates of the touch point a touched position of which is moved, and updates information relating to the touched position coordinates stored in the touch ID.

The processing in steps S331 and S332 is similar to the processing in steps S328 and S329. If a movement of the touched position is detected in step S324, and a number of touch points is determined as one in step S325 (i.e., "NO" in step S325), the information indicating an enabled/disabled state stored in the touch ID of the one touch point a touched position of which is determined to be moved in step S324 is set as "enabled" and updated.

Processing in steps S323 to S325 and steps S330 to S333 are described with reference to FIG. 4D. FIG. 4D illustrates a state where a touched position of one disabled touch point is moved after the touch disable flag is ON. As described above, because the touched position is moved in step S324, the touch operation is enabled and the touch disable flag is set to OFF. Therefore, at this time, the information stored in the touch ID indicates a touch ID number as "1", touch coordinates (xα, yα) as "(x2, y2)", and a touch enabled/disabled state as "enabled".

In step S333, the system control unit 50 sets the touch disable flag to OFF and stores the setting in the system memory 52. The touch disable flag is OFF when all of the touch points in a "Touch-On" state, a touch state of which is indicated as "disabled" in the information stored in the touch IDs when the touch disable flag is ON, are enabled according to the movement of the touched positions (i.e., a state in step S329 or S332). Alternatively, the touch disable flag is OFF when the touch ID is itself deleted according to a removal of the touch.

In step S334, the system control unit 50 determines whether all of touches at the touch points, which are indicated as "disabled" in the information stored in the touch ID, are removed from the touch panel 70a. If the system control unit 50 determines that all of the touches at the disabled touch points are removed (YES in step S334), the processing proceeds to step S335. If the system control unit 50 determines that all of the touches at the disabled touch points are not removed (NO in step S334), the processing proceeds to step S336.

In step S335, the system control unit 50 sets a touch disable flag to OFF and stores the setting in the system memory 52. In step S334, if the system control unit 50 determines that the touch is removed, the touch ID of the disabled touch point is deleted.

In step S336, the system control unit 50 determines whether new "Touch-Down" is performed on the touch panel 70a in addition to the touch point currently provided with the touch ID. If the system control unit 50 determines that "Touch-Down" is performed (YES in step S336), the processing proceeds to step S337. If the system control unit 50 determines that "Touch-Down" is not performed (NO in step S336), the processing proceeds to step S324.

In step S337, the system control unit 50 acquires touched position coordinates of the touch point at which "Touch-Down" is detected in step S336, and stores the touched position coordinates in the touch ID. The processing in steps S338 and S339 is similar to the processing in steps S328 and S329, and thus description is not repeated herein.

As described above, according to the present exemplary embodiment, when the touch operation is disabled because of the button operation or the dial operation, functions can be executed with high operability via the touch operation. When the user intentionally moves a touched position after a touch operation is disabled according to the button operation or the dial operation, the processing is executed while that touch point is taken as "Touch-Down". If the touch point is not moved, the touch remains in a disabled state unless the touch is removed. Therefore, the processing based on the touch intentionally performed by the user is executed at a timing at which the user moves the touched position. The processing is not executed based on the touch that remains without user's intention. Accordingly, the processing expected by the user can be executed with high operability.

Next, with reference to a table illustrated in FIG. 5, details of the processing described with reference to FIGS. 3A and 3B is described. FIG. 5 is a table illustrating functions or operations of the processing allocated to respective touch operations (i.e., "Touch-Down" processing, "Touch-Move"

processing, "Touch-Up" processing, and holding processing) at respective modes or screens.

There is a case where the user changes a setting value via the touch operation of any one of an absolute input and a relative input with respect to the touch panel 70a while looking into the viewfinder 104. In the absolute input, respective coordinates of the touch panel 70a and respective coordinates of the display unit 28 in the viewfinder 104 are associated with each other, and an AF frame is displayed based on the coordinates of a touched position. In the relative input, the respective coordinates of the touch panel 70a and the respective coordinates of the display unit 28 in the viewfinder 104 are not associated with each other, and an AF frame is moved from a current display position of the AF frame to a position moved by a distance corresponding to a moving distance of the touched position of the touch panel 70a. The user may previously set whether to perform the relative input or the absolute input.

In the absolute input, the AF frame is displayed at the touch coordinates of the touched position when a touch (i.e., "Touch-Down") is started. In the relative input, the AF frame is displayed at an AF position originally (or currently) set thereto, and the AF frame is moved when the touched position is moved. The AF frame is a frame for indicating an object of what position is selected as a target of AF processing from among objects that are imaging-targets. The user moves the AF frame to a desired position via "Touch-Move" and presses the shutter button 61, so as to adjust a focus to a desired object to capture an image.

The displayed AF frame is moved according to a movement of the touched position when the touched position is moved by the absolute input or the relative input. Then, when the touch is removed, tracking of the object inside the AF frame before removing the touch is started. Functions are not allocated to the multi-touch processing or holding processing when the user changes a setting value via a touch operation on the touch panel 70a while looking into the viewfinder 104. At this time, if the user moves the AF frame via a touch operation of the absolute input and captures an image by pressing the shutter button 61, the AF frame will not be moved unless the touched position is moved. Therefore, even if the user's nose is touching the touch panel 70a, the AF frame will not be moved to the touched position of the user's nose. In addition, the above-described exemplary embodiment can be executed only when the user looks into the viewfinder 104.

A playback screen for displaying a stored image will now be described. Although processing according to aa touch is not executed even if "Touch-Down" is performed on an image, information indicating detection of "Touch-Down" is displayed if "Touch-Down" is performed on an item displayed on the display unit 28. For example, a display mode such as a display color or a display size of the item is changed. After that, if "Touch-Up" is detected on that item, a function corresponding to that touched item is executed.

When a holding operation is detected on an item, a mode is shifted to a mode for changing a display position of the item. After that, the user can change a display position of the item by moving the touched position. When "Touch-Move" is performed on the image, the image displayed on the display unit 28 is switched. When "Pinch-Out" is performed on the image, the displayed image is enlarged. When "Pinch-In" is performed on the image, the displayed image is reduced.

A plurality of setting items enabling the user to change settings is displayed on a menu screen. When the user selects and determines an item the user would like to change the setting, the menu screen is shifted to a changing screen of the setting value, so that the user can change the setting value at the changing screen. When the touch is not performed on the menu screen, a cursor is displayed on the item that is currently being selected.

When "Touch-Down" is performed on the menu screen, the selected item is brought into a non-selected state. When "Touch-Up" is performed, an item at a touched position of "Touch-Up" is brought into a selected state and displayed thereon. When the user touches the item in a selected state again, that item is confirmed, and the menu screen is shifted to the changing screen. When the user performs "Touch-Move" in the vertical direction, a row of items can be slid in the vertical direction. Functions are not allocated to the multi-touch processing and the holding processing.

A list of character candidates such as Roman alphabet, Japanese letters "Hiragana", and numeric characters are displayed on a character input screen. None of the letters or numerals is selected when a touch is not performed, and a letter or a numeral at a "Touch-Down" position is selected when "Touch-Down" is performed. The user can change a selected letter or a numeral by performing "Touch-Move".

In a case where the user makes a determination or a selection via "Touch-Down", as with the case of the menu screen or the character input screen, unexpected processing is less likely to be executed if the input processing illustrated in FIGS. 3A and 3B is employed. For example, there is a case where the user operates an operating member (e.g., ISO button) other than the touch panel 70a to display a bar for changing a setting value, such as an ISO sensitivity. Because the ISO sensitivity is changed according to the "Touch-Down" with respect to a setting value provided on the displayed bar, even if the touch remains after the user has operated the ISO button and displays the bar for changing the ISO sensitivity, the ISO sensitivity will not be changed to a setting value displayed at the touched position.

In the present exemplary embodiment, because "Touch-Down" processing is not executed until the touched position is moved, even if an item representing a function to be executed at a timing of ending the button operation via "Touch-Down" with respect to the touched position is displayed thereon, unexpected processing is less likely to be executed. In other words, even if "Touch-On" remains when the user intends to execute processing only corresponding to the button operation or the dial operation, the item displayed at a touched position can be prevented from being determined or selected concurrently with the end of the button (or dial) operation.

Various types of control described as the operation executed by the system control unit 50 can be executed by a single piece of hardware, and a plurality of pieces of hardware can execute control of the apparatus by sharing the processing.

While the present disclosure has been described in detail with reference to exemplary embodiments, it is to be understood that the above-described exemplary embodiments are not seen to be limiting, and many variations that do not depart from the essential spirit of the present disclosure are applicable. The above-described exemplary embodiments can be combined as appropriate.

While the above-described exemplary embodiment described the digital camera 100 as an example, this is not seen to be limiting, and any electric device that controls execution of processing according to a touch operation and an operation to an operating member, such as a button or a dial, is applicable.

In other words, the present disclosure is applicable to a personal computer (PC), a mobile phone terminal, a mobile type image viewer, a digital photo frame, a music player, a game machine, an electronic book reader, a tablet PC, a smartphone, a projection apparatus, and a home electric appliance having a display unit. The present disclosure is also applicable to an apparatus, such as a smartphone, a tablet PC, or a desktop PC, which receives a live view image captured by a digital camera (including a network camera) via wired or wireless communication to display the live view image and remotely controls the digital camera.

<Other Exemplary Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, functions can be executed with high operability via a touch operation after the operation of an operating member that exclusively accepts operations other than the touch operation ends.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-158900, filed Aug. 12, 2016, which is hereby incorporated by reference herein in its entirety.

What is claimed is:

1. An electronic device comprising:
   at least one processor; and
   at least one memory storing instructions to be executed by the at least one processor,
   wherein the at least one processor executes the instructions to function as:
   a touch detection unit configured to detect a touch operation on a touch panel;
   a member operation detection unit configured to detect an operation to an operating member different from the touch panel; and
   a control unit configured to:
   control a first processing executed based on a start of a first touch on the touch panel when the operation is not performed,
   control a second processing executed based on a touch operation of the first touch when the touch operation is performed after the start of the first touch,
   control the second processing not to be executed based on the touch operation of the first touch while the operation is performed if the operation is performed when the first touch is performed, and
   control the first processing to be executed based on a movement of a touched position of the first touch after the operation is no longer performed.

2. The electronic device according to claim 1, wherein the control unit controls the first processing not to be executed based on the touch operation of the first touch, unless the touched position of the first touch is moved after the operation ends.

3. The electronic device according to claim 1, wherein the operation is an operation of pressing a button or an operation of rotating a dial.

4. The electronic device according to claim 1, wherein the control unit controls the second processing not to be executed based on the touch operation of the first touch even if the touched position of the first touch is moved while the operation is performed.

5. The electronic device according to claim 1, wherein the first processing includes at least one of displaying an item, selecting an item, or changing an item display mode.

6. The electronic device according to claim 1, wherein the control unit controls the second processing to be executed based on a movement of a touched positon of the first touch when the touched position of the first touch is moved after the first processing is executed based on a movement of the touched position of the first touch.

7. The electronic device according to claim 1, wherein, in a case where the first touch and a second touch different from the first touch are performed when an operation to the operating member is performed, the control unit does not execute the first processing based on the second touch unless a touched position of the second touch is moved, where the first processing is performed based on the first touch based on a movement of a touched position of the first touch after the operation ends.

8. The electronic device according to claim 1, wherein, after the operation is performed, based on a start of a third touch that is different from a touch operation performed prior to the operation, the control unit controls the first processing to be executed based on the third touch.

9. The electronic device according to claim 1, wherein a shutter button is included in the operating member.

10. The electronic device according to claim 1 further comprising an approach detection unit configured to detect an object approaching a viewfinder provided contiguous to the touch panel,
   wherein the control unit executes the control in a case where the approach detection unit detects approach of an object to the viewfinder.

11. The electronic device according to claim 1 further comprising an imaging unit configured to execute imaging,
   wherein the first processing and the second processing are processing relating to imaging executed by the imaging unit.

12. The electronic device according to claim 11, wherein the first processing and the second processing are processing relating to a setting of an autofocus (AF) position set when imaging is executed by the imaging unit.

13. A control method of an electronic device comprising:
   detecting a touch operation on a touch panel;
   detecting, an operation to an operating member different from the touch panel; and
   controlling:
      a first processing executed based on a start of a first touch on the touch panel when the operation is not performed,
      a second processing executed based on a touch operation of the first touch when the touch operation is performed after the start of the first touch,
      the second processing not to be executed based on the touch operation of the first touch while the operation is performed if the operation is performed when the first touch is performed, and
      the first processing to be executed based on a movement of a touched position of the first touch after the operation ends.

14. A non-transitory computer-readable storage medium storing a program for executing a control method of an electronic device comprising:
   detecting a touch operation on a touch panel;
   detecting, an operation to an operating member different from the touch panel; and
   controlling:
      a first processing executed based on a start of a first touch on the touch panel when the operation is not performed,
      a second processing executed based on a touch operation of the first touch when the touch operation is performed after the start of the first touch,
      the second processing not to be executed based on the touch operation of the first touch while the operation is performed if the operation is performed when the first touch is performed, and
      the first processing to be executed based on a movement of a touched position of the first touch after the operation ends.

* * * * *